United States Patent
Tanaka et al.

[11] Patent Number: 6,039,910
[45] Date of Patent: Mar. 21, 2000

[54] GOLF BALL AND MANUFACTURING METHOD OF GOLF BALL CORE

[75] Inventors: Hiroaki Tanaka; Yoshiyuki Okido; Hideki Sano, all of Kobe, Japan

[73] Assignee: Sumitomo Rubber Industries, Ltd., Kobe, Japan

[21] Appl. No.: 09/126,418

[22] Filed: Jul. 30, 1998

[30] Foreign Application Priority Data

Aug. 28, 1997 [JP] Japan ................................ 9-249448

[51] Int. Cl.[7] .................................................. B29C 65/00
[52] U.S. Cl. .................... 264/248; 473/264; 473/239; 473/373; 473/374; 473/376; 264/250; 264/267; 264/279.1; 264/320
[58] Field of Search ........................ 473/376, 374, 473/373, 239, 264; 264/250, 267, 279.1, 320, 248

[56] References Cited

U.S. PATENT DOCUMENTS

| | | | |
|---|---|---|---|
| 4,501,715 | 2/1985 | Barfield et al. | 264/248 |
| 4,543,140 | 9/1985 | Price | 156/157 |
| 4,650,193 | 3/1987 | Molitor et al. | 273/228 |
| 4,871,503 | 10/1989 | Ishii et al. | 264/248 |
| 5,692,973 | 12/1997 | Dalton | 473/374 |
| 5,697,856 | 12/1997 | Moriyama et al. | 473/374 |
| 5,783,293 | 7/1998 | Lammi | 428/212 |
| 5,849,168 | 12/1998 | Lutz | 264/755 |
| 5,857,925 | 1/1999 | Sullivan et al. | 473/374 |
| 5,876,294 | 3/1999 | Yamagishi et al. | 473/374 |
| 5,919,101 | 7/1999 | Yokota et al. | 473/374 |
| 5,967,907 | 10/1999 | Takemura et al. | 473/373 |
| 5,971,871 | 10/1999 | Sullivan et al. | 473/373 |

FOREIGN PATENT DOCUMENTS

| | | |
|---|---|---|
| 61-25579 | 2/1986 | Japan . |
| 63-105774 | 5/1988 | Japan . |
| 2-228978 | 9/1990 | Japan . |
| 6-218077 | 8/1994 | Japan . |

*Primary Examiner*—Jeanette Chapman
*Assistant Examiner*—Dolores Collins
*Attorney, Agent, or Firm*—Armstrong, Westerman, Hattori, McLeland & Naughton

[57] ABSTRACT

A golf ball core and a method of making the same wherein remarkable reduction of eccentricity of an inner layer to an outer layer is accomplished, and mass-production of the golfball cores are possible. The golfball inner layer is penetrated into at least a part of a seam portion of the outer layer. A volume of an intrusive portion of the inner layer into the outer layer is arranged to be $\frac{1}{300}$ to $\frac{1}{5}$ of a volume of the outer layer, suppose the outer layer is a complete spherical shell. To form a core, an unvulcanized material is semi-vulcanized or vulcanized to form an outer layer half shell whose configuration is generally a hemispherical shell, and an unvulcanized inner layer forming material is put between the pair of outer layer half shells and vulcanizing pressed.

7 Claims, 11 Drawing Sheets

GOLF BALL AND MANUFACTURING METHOD OF GOLF BALL CORE

BACKGROUND OF THE INVENTION

1. Field of the Invention

This invention relates to golf balls and a method of manufacturing golf ball cores.

2. Description of the Related Art

Conventional methods of manufacturing golf balls of multiple-layer construction which avoid the golf balls from being eccentric are such as below:

① First, an inner core is vulcanized and molded, then the inner core is held in a predetermined position in an outer layer metallic mold by, for example, a movable hold pin, and a material to form an outer layer is injected into the mold by an injection molding machine or a transfer mold. The hold pin is pulled out timely, and the inner core and the material injected into the mold are vulcanized.

② An outer layer, whose configuration is a hemispherical shell, is formed by semi-vulcanizing a material which is put between a hemispherical recessed mold and a hemispherical convex mold, or by heating a material which is put between a hemispherical recessed mold and a hemispherical convex mold for a fixed time so that the outer layer stays unvulcanized and is not shrank. Then the hemispherical convex mold is removed, and the outer layer shaped like a hemispherical shell is left on the hemispherical recessed mold, and an inner core that is vulcanization molded is set in the outer layer. And vulcanization press the inner core and the outer layer.

③ This is the method ② wherein a sheet-like outer layer is used instead of forming an outer layer shaped like a hemispherical shell.

The conventional methods described above are disclosed in Japanese Patent Provisional Publication No. 63-105774, Japanese Patent Provisional Publication No. 2-228978, and Japanese Patent Provisional Publication No. 6-218077.

However in the conventional methods of manufacturing golf balls, to reduce eccentricity of an inner core (inner layer), efficiency of manufacturing operation of balls was not concerned. For example, in the conventional method ①, the construction of the mold, which the inner core is held in the metallic mold by the movable hold pin, and the hold pin is pulled out as the material for forming the outer layer is injected into the mold by an injection molding machine or a transfer mold, is greatly complicated. The complicated construction of the mold costs high, and number of balls obtained by one press were small because of the limitation of pressure on injection, and the mold is not suitable for mass-production. Adjustment of clearance of mold for a movable pin is bothersome, because if the clearance is too small, the movable pin will not move well, and if the clearance is too large, rubber will flow out from the clearance.

In the conventional method ②, the problems raised in the method ID such as the smallness of the number of the golf balls obtained by one press, and the complicated construction of the metallic mold were solved. However when forming an outer layer to be a hemispherical shape, the formed hemispherical outer layer is needed to be left adhered to the hemispherical recessed mold for forming an outer layer, the most part of the outer layer was adhered to the hemispherical convex mold, and the operation of removing the outer layer to the hemispherical mold was required. Thus the method is not suitable for mass-production. In the conventional method ③, the outer layer which is a hemispherical shape in the method ② is designed to be like a sheet. The problems raised in the method ② are still left unsolved. Another conventional method besides ① to ③ is disclosed in Japanese Patent Provisional Publication No. 61-25579. It is a known method that a projection of which the length is identical with the thickness of an outer layer is integrally molded on a surface of an inner layer, and the inner layer is covered with an outer layer of a quasi spherical shape shell. With the method, theoretically the eccentricity may be 0, however a projection is integrally molded on the inner layer and the easiness of releasing the layer from mold may be a problem. The inner core provided with a projection may be cut out from a material having a diameter which is same as the diameter of the outer layer, however it requires a long time, and the method is unrealistic.

It is therefore an object of the present invention to provide golf balls wherein the problems described above are solved, a remarkable reduction of eccentricity of an outer layer to an inner layer in a golf ball core is accomplished, and mass-production of the golf balls are possible. Moreover the golf balls superior in durability and their frying performance are objected to be obtained.

It is another object of the present invention to provide a method of manufacturing golf ball cores wherein an eccentricity of an outer layer to an inner layer in a core is remarkably reduced and mass-production of golf ball cores are possible.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
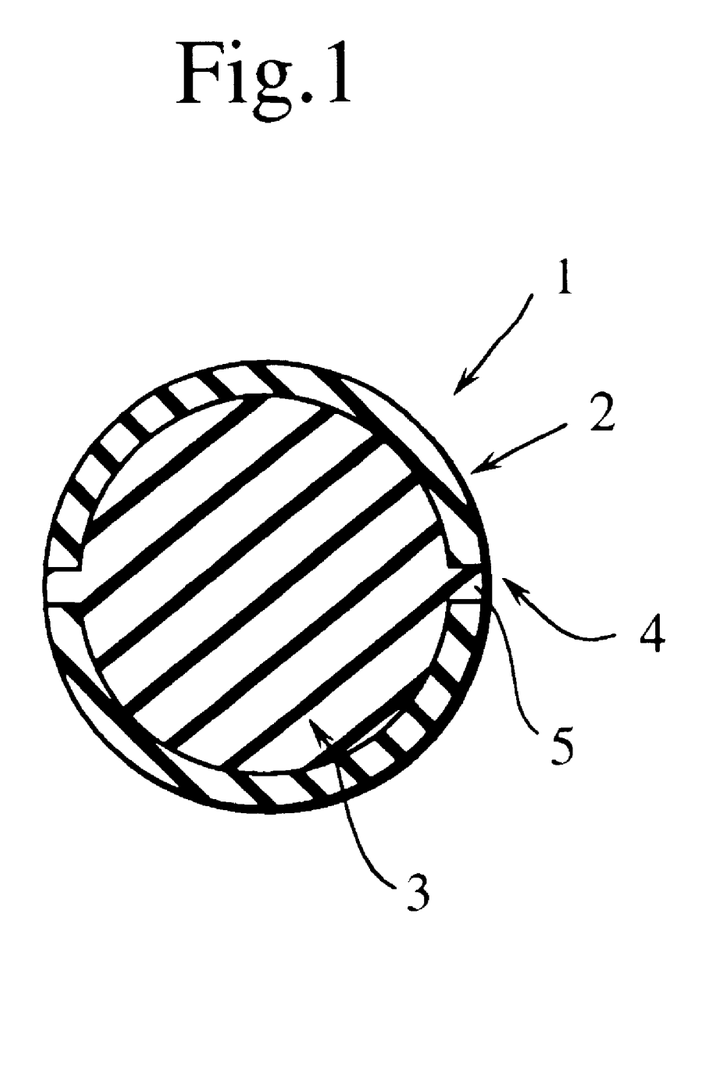
FIG. 1 is a sectional view of a core of a golf ball according to the present invention.

FIG. 1 shows a core 1 of a two-piece golf ball comprising an outer layer 2 and an inner layer 3. The golf ball according to the present invention has the core 1 on which a cover material (not shown) is layered. The golf ball is a three-piece golf ball having three-layer construction or a multiple-piece golf ball having at least four-layer construction. The inner layer 3 is penetrated, i.e. intruded into a seam portion 4 of the outer layer 2. A volume of the intruded portion 5 of the inner layer 3 into the outer layer 2 is arranged to be 1/300 to 1/5 of a volume of the outer layer 2 suppose the outer layer 2 is a perfect spherical shell. The seam portion 4 indicates an area where the ends of a pair of outer layer half shells (which are shaped like hemispherical shells) are opposed or a proximal part of the area.

Figure 2:
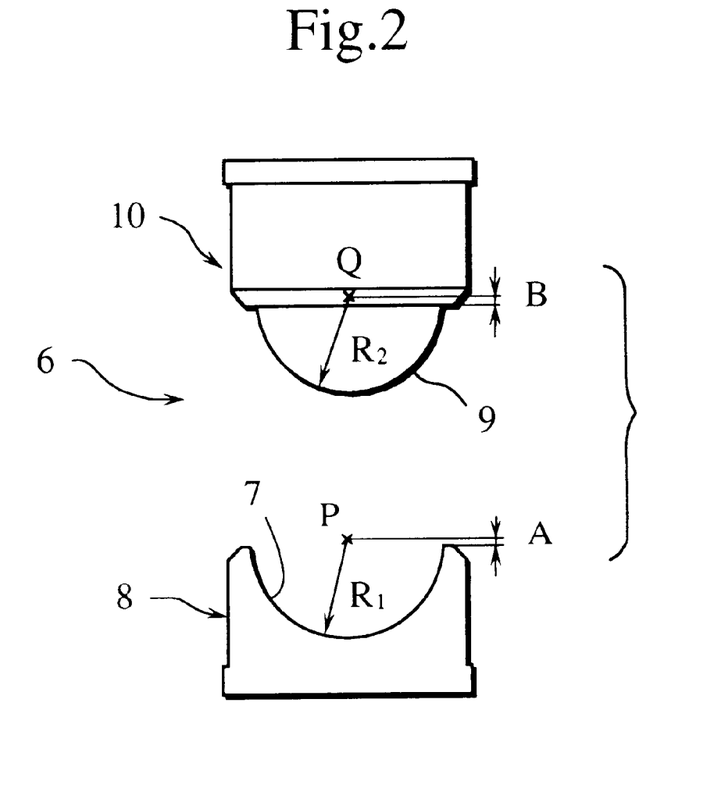
FIG. 2 is a sectional view of a mold for forming an outer layer half shell.

FIG. 2 shows a metallic mold 6 for molding an outer layer half shell which will be explained later. The metallic mold 6 is comprising a recessed mold 8 which has a hemisphere-like recessed portion 7, and a convex mold 10 which has a hemisphere-like convex portion 9. A depth of the hemisphere-like recessed portion 7 of the recessed mold 8 is formed shallower than a depth of an accurate hemisphere, and the hemisphere-like convex portion 9 of the convex mold 10 is formed to protrude lower than an accurate hemisphere. Off-center values A, B of the hemisphere-like recessed portion 7 and the hemisphere-like convex portion 9 are respectively arranged to be 0.01 mm to 0.70 mm. The off-center values A, B are preferably arranged to be 0.05 mm to 0.70 mm.

The off-center value A is a length between a point P, which is the center point of the sphere including the hemisphere-like recessed portion 7 and locates at outer position of the hemisphere-like recessed portion 7, and a plane which includes an opening end rim of the hemisphere-like recessed portion 7. The off-center value B is a length between a point Q, which is the center point of the sphere including the hemisphere of the hemisphere-like convex portion 9 and locates at outer position of a circular end surface of the hemisphere-like convex portion 9, and the circular end face of the hemisphere-like convex portion 9. The hemisphere-like recessed portion 7 is comprising a recessed surface whose center point is the point P and have the radius $R_1$, and the depth of the hemisphere-like recessed portion 7 is arranged to be shallower (shorter) than the radius $R_1$ by the off-center value A.

The hemisphere-like convex portion 9 is comprising a convex surface whose center point is the point C and have the radius $R_2$, and the depth of the protrusion of the hemisphere-like convex portion 9 is arranged to be smaller than the radius $R_2$ by the off-center value B. The radius $R_1$ of the hemisphere-like recessed portion 7 is arranged to be larger than the radius $R_2$ of the hemisphere-like convex portion 9 by a predetermined length so that a cavity can be formed when the mold, i.e. the recessed mold 8 and the convex mold 10, is closed.

Figure 3:
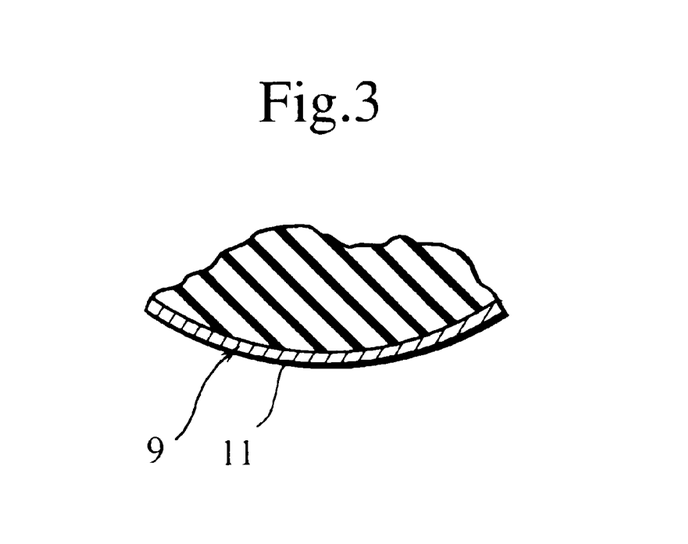
FIG. 3 is an enlarged sectional side view of a principle portion of a convex mold.

As shown in the enlarged sectional view of FIG. 3, the hemisphere-like convex portion 9 is coated with a mold release agent 11 which is without a property of transfer. A mold release agent 11 is, for example, a fluororesin. Specifically, a solvent soluble fluororesin such as 'Cytop CTL-109S', manufactured by Asahi Glass Co, Ltd., is preferable. A general fluororesin coating may be used as the mold release agent 11.

Figure 4A:
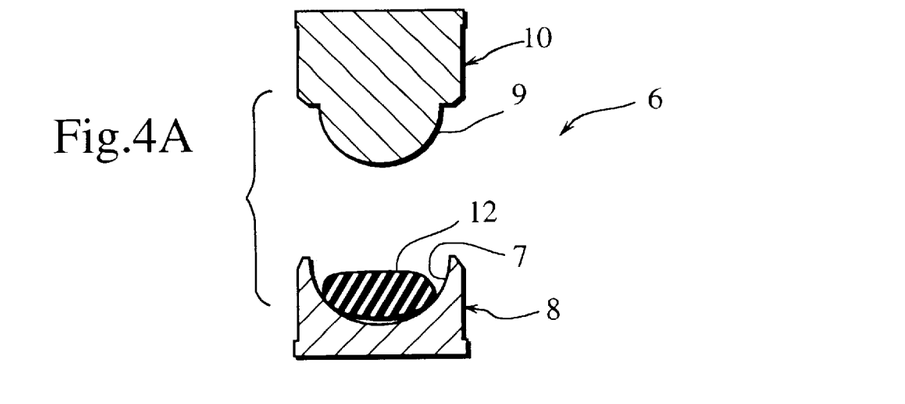
FIG. 4A is an explanatory view of an open mold for manufacturing a golf ball core.
Figure 4B:
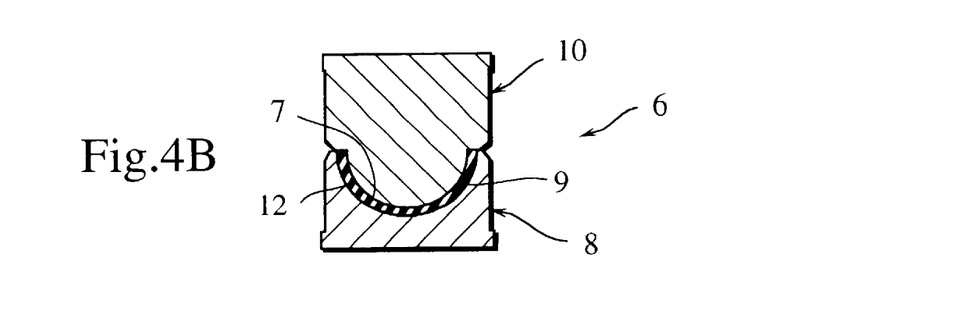
FIG. 4B is an explanatory view of the mold of FIG. 4A in a closed position manufacturing a golf ball core.
Figure 4C:
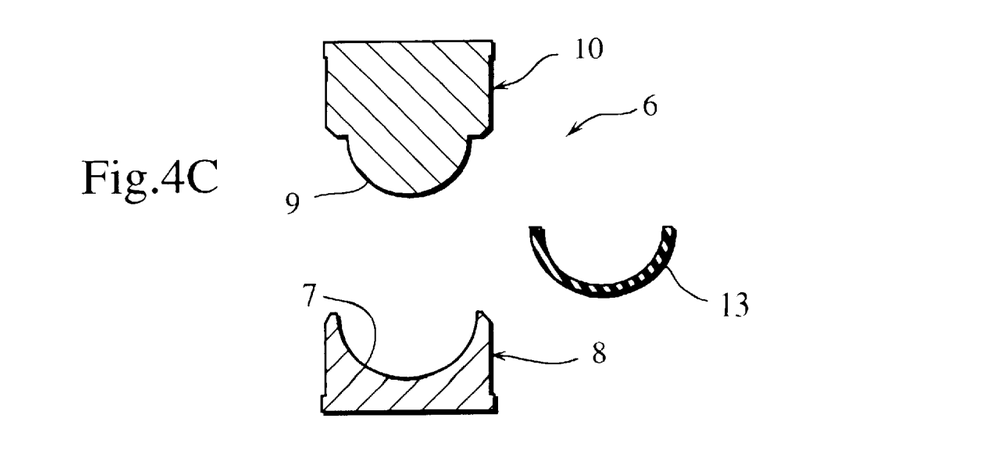
FIG. 4C is an explanatory view of the mold of FIG. 4B reopened manufacturing a golf ball core.
Figure 5:
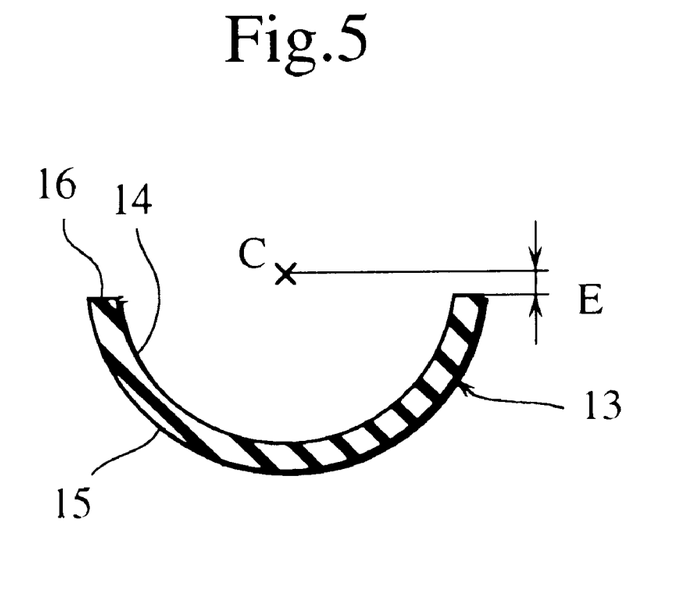
FIG. 5 is a sectional view of an outer layer half shell.

A method of manufacturing golf ball cores according to the present invention will now be described. First, as shown in FIGS. 4A, 4B and 4C, an unvulcanized material 12 is semi-vulcanized to form an outer layer half shell 13 having a shape of a hemispherical shell. To be more specific, the unvulcanized material 12 is put into the hemisphere-like recessed portion 7 of the recessed mold 8 of the metallic mold 6 as shown in FIG. 4A. Before or after putting the unvulcanized material 12 into the recessed mold 8, a mold release agent 11, which will not transfer, is applied to the hemisphere-like convex portion 9. After that, as shown in FIG. 4B, the metallic mold 6 is closed, i.e. the recessed mold 8 and the convex mold 10 are put together, and the unvulcanized material 12 is semi-vulcanizing pressed. Then the recessed mold 8 and the convex mold 10 are separated and the outer layer half shell 13 is taken out as shown in FIG. 4C. In this process, because the hemisphere-like convex portion 9 is coated with the mold release agent 11, which does not have the property of transfer, the outer layer half shell is easy to be removed from the mold. The mold release agent will not be transferred to an inner face of the half shell 13. This molded outer layer half shell 13 is, as shown in FIG. 5, smaller than a perfect hemispherical shell, and the center point C of the recessed face 14 and of the convex face 15 locates outside of the end face 16 by the predetermined length.

Figure 6:
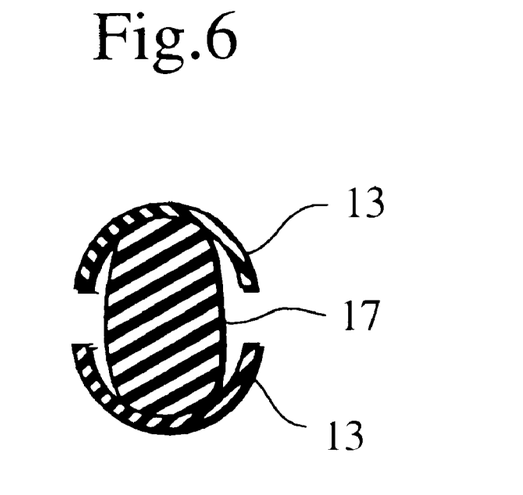
FIG. 6 is an explanatory view of a method of manufacturing a golf ball core.
Figure 7:
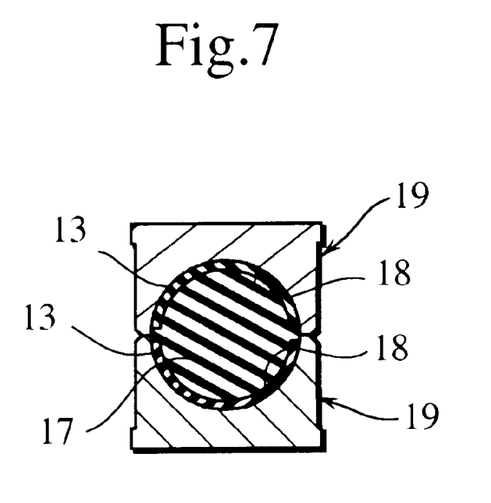
FIG. 7 is an explanatory view of the method of manufacturing a golf ball core.
Figure 8:
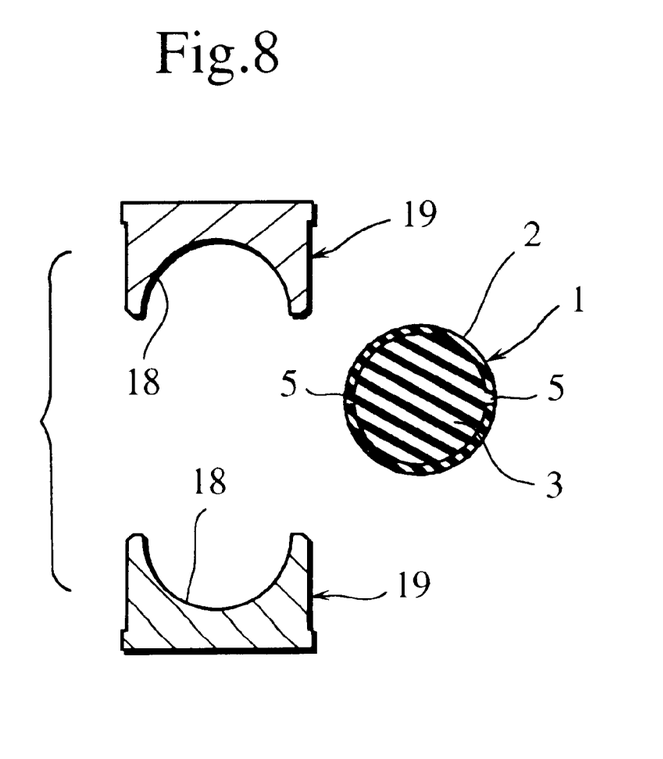
FIG. 8 is an explanatory view of a condition that a golf ball core is removed from a mold.
Figure 9:
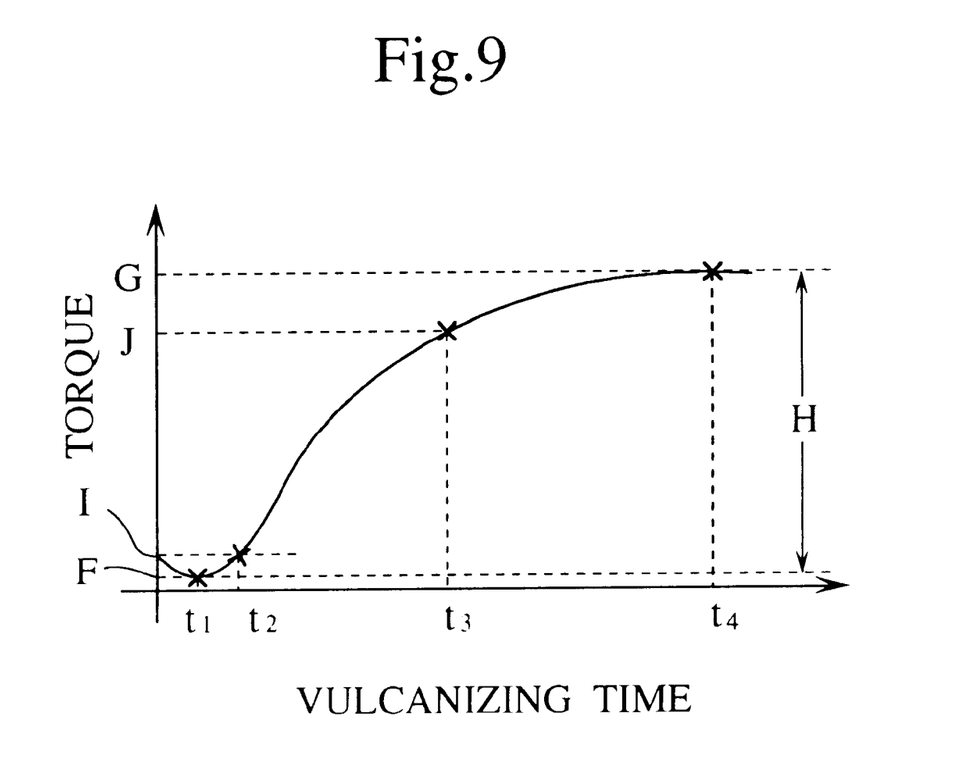
FIG. 9 is a graph showing relations of torque and vulcanizing time.

Next, as shown in FIG. 6, an inner layer forming material 17 is put between a pair of outer layer half shells 13. And as shown in FIG. 7, vulcanizing press mold the inner layer forming material 17 which is put between the pair of outer layer half shells 13 by holding these in hemispherical recessed portions 18, comprising perfect hemispherical surfaces, of core forming recessed molds 19. Because each of the pair of outer layer half shells 13 is smaller than the perfect hemisphere, there is a small space between the opposed pair of outer layer half shells 13, and the inner layer forming material 17 is flow into the space. A portion, where the inner layer forming material 17 is flowed into, holds the inner layer forming material 17 in the center of the pair of outer layer half shells 13. The portion becomes the intrusive portion 5 of the inner layer 3. As shown in FIG. 8, a core 1 can be took out as the pair of recessed molds 19 are separated. As described above, the unvulcanized inner layer forming material 17 is put between the outer layer half shells 13 and the material and the outer layers are vulcanizing pressed, and a two-layer construction golf ball core comprising the outer layer 2 and the inner layer 3 is formed. In the process of molding the outer layer half shell 13 showing in FIG. 4A, 4B and 4C, a semi-vulcanization degree of the outer layer half shell 13 is regulated as explained below. FIG. 9 is a graph showing a relationship between a torque and a vulcanizing time that is measured by Curelastometer (trade name: 'JSR Curelastometer III D-type' manufactured by Japan Synthetic Rubber Co. Ltd.) while vulcanizing the unvulcanized material (a raw rubber) until the material is completely vulcanized. The graph shows that the more the torque increases, the more the vulcanization degree advances and harden the rubber. The temperature for measuring torque of the material is arranged to be 160° C. (it may range from 150° C. to 170° C.), and an amplitude of Curelastometer is arranged to be 3°. The other conditions of measurement comply with JIS (Japanese Industrial Standard) K6300. As the graph shows, after $t_1$ minutes, right after starting vulcanization, the minimum value F of the torque is measured. The torque increases gradually, and after $t_4$ minutes at which the vulcanization is completed, the maximum value G of the torque is measured.

The semi-vulcanization degree of the outer layer half shell 13 is regulated such that the torque to be 5% to 80% of the difference H between the minimum value F and the maximum value G measured by Curelastmeter. In the graph, the torque of 5% of the difference H is equivalent to the value of the torque I at $t_2$ minutes, and the torque of 80% of the difference H is equivalent to the value of the torque J at $t_3$ minutes. The vulcanization is suspended between $t_2$ minutes to $t_3$ minutes. If a composite proportion of each substance in weight in the unvulcanized material 12 is arranged that acrylic zinc to be 24.5, zinc oxide 19.8, antioxidant 0.5, and dicumylperoxide 1.0, while arranging BR 01 to be 100, and the material is vulcanized at 150° C., t2 minutes is arranged to be 3 minutes and $t_3$ minutes is arranged to be 14 minutes. Therefore, the vulcanization is suspended between 3 minutes to 14 minutes after starting vulcanization.

The semi-vulcanization degree of the outer layer half shell 13 is arranged as described above, because of the reason if the semi-vulcanization degree is arranged to be less than 5% of the difference H between the minimum value F and the maximum value G, insufficiency of elasticity of the outer layer half shell 13 is caused and it makes the outer layer half shell 13 difficult to maintain the hemisphere-like shape, and an inner core 3 may be greatly eccentric thereby. If the semi-vulcanization degree is arranged to exceed 80% of the difference H of the minimum value F and the maximum value G, it causes an inner layer 3 and an outer layer 2 difficult to stick together and easy to be separated. It is preferable that the semi-vulcanization degree of the outer layer half shell 13 is arranged to be in the range of 15% to 70% of the difference H between the minimum value F of the torque right after starting vulcanization and the maximum value G after completion of vulcanization. It is preferred to semi-vulcanize a whole body of the outer layer half shell 13, but alternatively, only the recessed face 14 of the outer layer half shell 13 may be incompletely vulcanized, or semi-vulcanized as cooling the convex mold 10 and heating the recessed mold 8. In that case, hardness of the recessed face 14 of the outer layer half shell 13 is arranged to be same as the outer layer half shell 13 which is entirely semi-vulcanized.

Figure 10A:
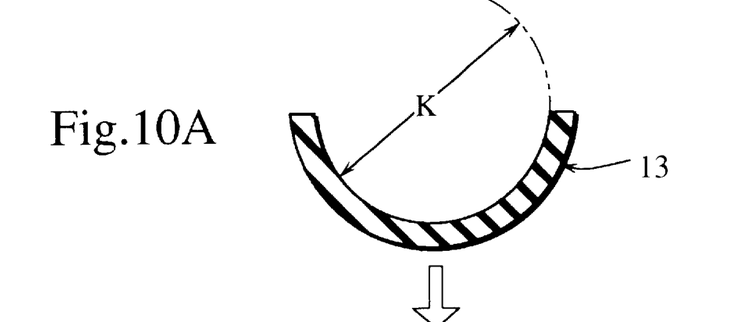
FIG. 10A is a first view of shrinking of an outer layer after vulcanization.
Figure 10B:
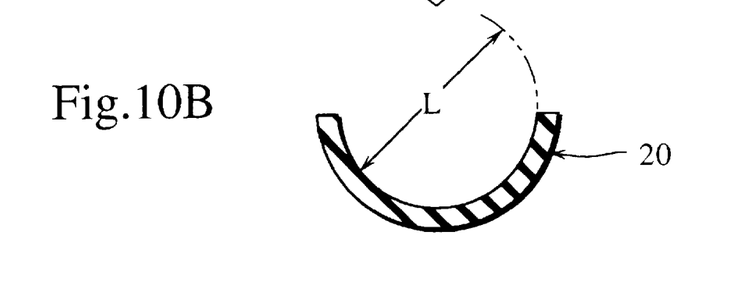
FIG. 10B is a second view of shrinking of an outer layer after vulcanization.
Figure 11A:
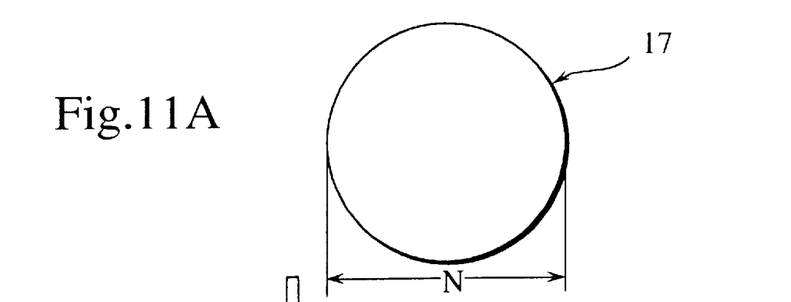
FIG. 11A is a first view of shrinking of an inner layer after vulcanization.
Figure 11B:
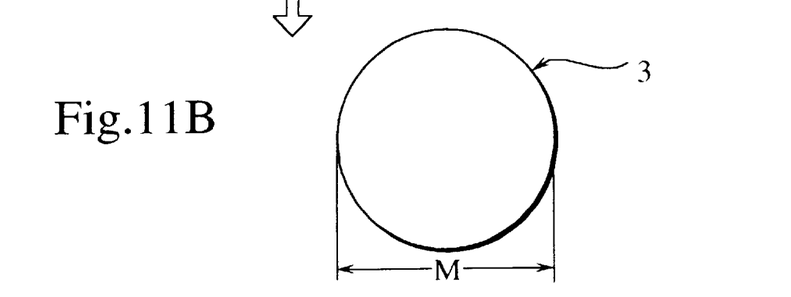
FIG. 11B is a second view of shrinking of an inner layer after vulcanization.

Composite proportion of each component in the outer layer and the inner layer to be vulcanizing pressed is arranged such that a difference between the inner diameter K of the outer layer half shell 13 shown in FIG. 10A and the inner diameter L of an imaginary outer layer 20, which is an outer layer half shell 13 vulcanized in a free condition, shown in FIG. 10B becomes 0.5 times to 3.0 times as long as a difference between the inner diameter K of the outer layer half shell 13 shown in FIG. 10A and an outer diameter M of an inner layer 3 which is vulcanizing pressed as shown in FIG. 11B. That is to say, composite proportion of each component in the outer layer and the inner layer to be vulcanizing pressed is arranged such that a difference between the inner diameter K of the outer layer half shell 13 shown in FIG. 10A and the inner diameter L of the imaginary outer layer 20, which is the outer layer half shell 13 vulcanized in a free condition, shown in FIG. 10B becomes 0.5 times to 3.0 times as long as a difference between the outer diameter N of the inner layer forming material 17 right after starting vulcanizing press shown in FIG. 11A and an outer diameter M of an inner layer 3 which is after completion of vulcanizing press as shown in FIG. 11B.

Generally, in a rubber composition, the more the rubber component included, the more the rubber composition shrinks. Therefore when the outer layer 2 and the inner layer 3 are composed of BR 01, acrylic zinc, zinc oxide, antioxidant, and dicumylperoxide, zinc oxide is reduced from the outer layer 2 to the extent that does not change a hardness of the outer layer 2 and increase the shrinkage of the outer layer 2. If a composite proportion of BR 01 in weight in the rubber composition is arranged to be 100, the zinc oxide is required to be at least 5. Reducing the zinc oxide causes the rubber composition to shrink more. According to the weight reduction in the outer layer, zinc oxide, barium sulfate, or calcium carbonate of which increase have no effect on vulcanization is added to the inner layer to add weight to a core 1, and this adjust the weight of the core 1 as a whole, and shrinkage of the inner core is reduced thereby.

As the rubber composition is composed as described above, the outer layer 2 shrinks greater than the inner layer 3, and the outer layer and the inner layer adhere closely. If the difference between the inner diameter K of the outer layer half shell 13 and the inner diameter L of an imaginary outer layer 20, which is an outer layer half shell 13 vulcanized in a free condition, is less than 0.5 times the difference between the inner diameter K of the outer layer half shell 13 and the outer diameter M of the inner layer 3 vulcanizing pressed, adhesion of the outer layer to the inner layer become worse, and separation between the layers may happen. If the difference between the inner diameter K of the outer layer half shell 13 and the inner diameter L of an imaginary outer layer 20, which is an outer layer half shell 13 vulcanized in a free condition, over 3 times the difference between the inner diameter K of the outer layer half shell 13 and the outer diameter M of the inner layer 3 vulcanizing pressed, a circumferential tension will act on the outer layer 2, and a durability of the core deteriorates.

According to the method of manufacturing golf ball cores of the present invention, the core 1, whose eccentricity is remarkably decreased and comprising the outer layer 2 and the inner layer 3 adhere closely together, is manufactured by metallic molds of simple construction. This method decreases number of manufacturing operations and increases efficiency of manufacturing operation of golf ball cores. Therefore the method is suitable for mass-production of golf ball. The cores manufactured by the method of the present invention has no adverse effect in balls' flying performance, and great durability of golf balls can be gained thereby.

The reason that the off-center values A, B of the hemisphere-like recessed portion 7 and the hemisphere-like convex portion 9 are respectively arranged to be in the range of 0.01 to 0.70 mm is now be described. If the off-center values A, B are below 0.01 mm, a shape and a volume of the intrusive portion 5 of the inner layer 3 into the outer layer 2 in the core 1 may be variable, and an eccentricity of the inner layer 3 may increase. If the off-center values A, B are more than 0.70 mm, the volume of the intrusive portion 5 of the core may be too large, i.e. the volume of the intrusive portion 5 may be more than ⅕ of the volume of the outer layer 2 supposing the outer layer 2 is a perfect spherical shell. Then the cores of such have adverse effect in balls' flying performance.

In the golf balls of the present invention, the volume of the intrusive portion 5 of the inner layer 3 into the outer layer 2 in the core 1 is arranged to be ⅟₃₀₀ to ⅕ of the volume of the outer layer 2, suppose the outer layer 2 is a perfect spherical shell. Because of the reason that if the volume of the intrusive portion 5 is below ⅟₃₀₀ of the outer layer 2, the eccentricity of the inner layer 2 increases and it affects balls' flying performance, and if the volume of the intrusive portion 5 is over ⅕ of the volume of the outer layer 2, suppose the outer layer 2 is a perfect spherical shell, it also have adverse effect in balls' flying performance.

Figure 12:
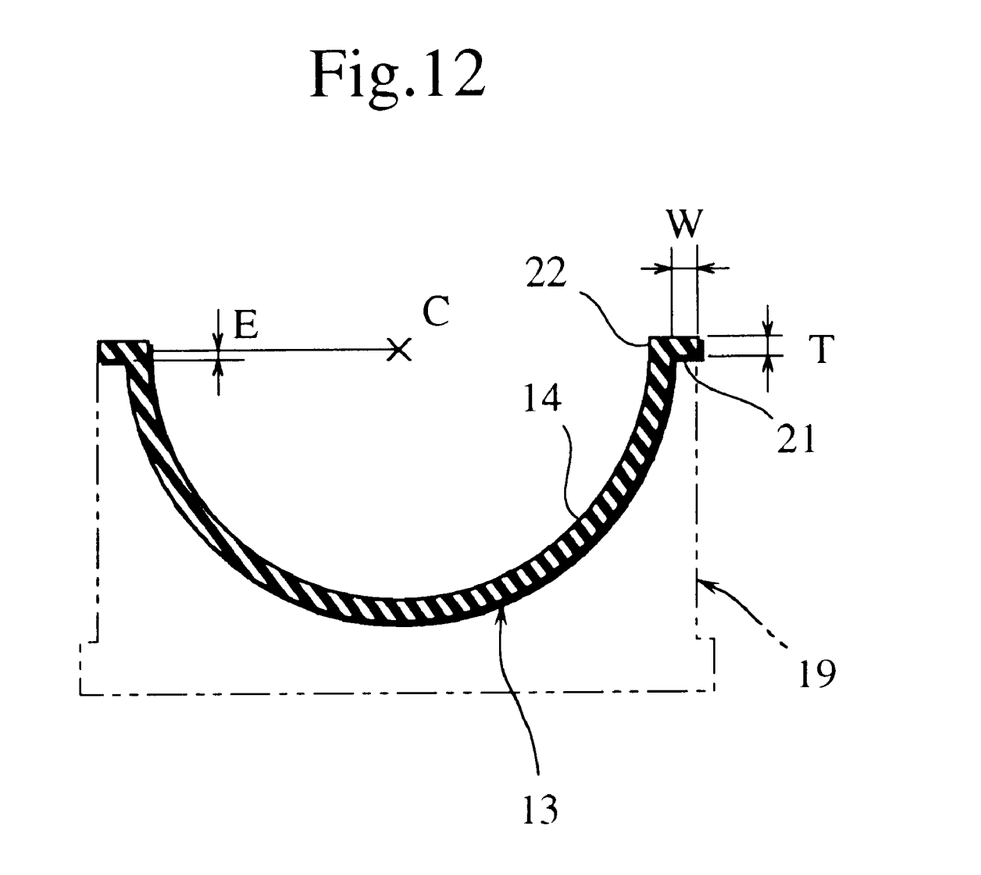
FIG. 12 is another sectional view of an outer layer half shell.

Next, an outer layer half shell 13 is shown in FIG. 12, which is provided with an outer flange 21, 0.1 mm to 1.5 mm in thickness T and 0.5 mm to 15.0 mm in width W, integrally formed on an opening end portion of the outer layer half shell 13. A recessed surface 14 of the outer layer half shell 13 is shallower than a perfect hemisphere, and a straight portion 22, having the same thickness as the outer flange 21, is formed on an upper end portion of the recessed surface 14 and next to the outer flange 2. The center point C of the hemisphere is located on outer position of the upper end portion of the recessed surface 14 by a predetermined length E. The predetermined length E is arranged to be ½ of the thickness T. The outer layer half shell 13 of such construction is held in a stable position in a hemisphere-like recessed portion 18 of a core forming recessed mold 19 when vulcanizing press, thereby variations of a shape and a volume of an intrusive portion 5 of the inner layer 3 into the outer layer 2 can be reduced. Furthermore the volume of the intrusive portion 5 is easily arranged to be ⅟₃₀₀ to ⅕ of the volume of the outer layer 2, suppose the outer layer 2 is a perfect spherical shell, and the eccentricity of the inner layer 3 can be accurately decreased.

The reason that the thickness T is arranged to be 0.1 mm to 1.5 mm is now be described. If the thickness T is less than 0.1 mm, a supporting force of the outer layer half shell 13 itself is too small when vulcanizing press, and if the thickness T is more than 1.5 mm, a portion of the outer layer half shell 13 may be pressed into the layer too much, and it causes balls' flying performance degradation. The reason that the width W is arranged to be 0.5 mm to 15.0 mm is now be described. If the width is less than 0.5 mm, a supporting force of the outer layer half shell 13 itself is too small when vulcanizing press, and if the width W is more than 15.0 mm, the material may be wasted.

Figure 13:
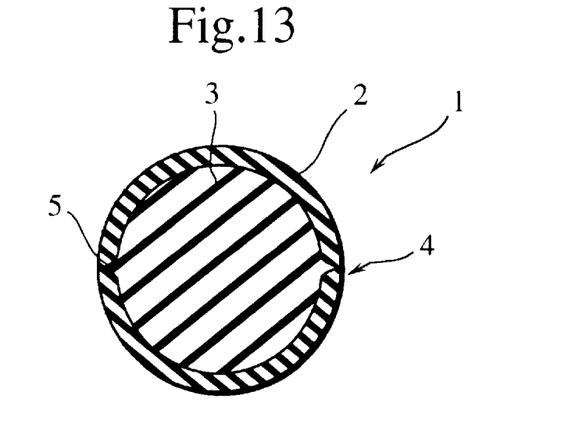
FIG. 13 is another sectional view of a core of a golf ball.
Figure 14A:
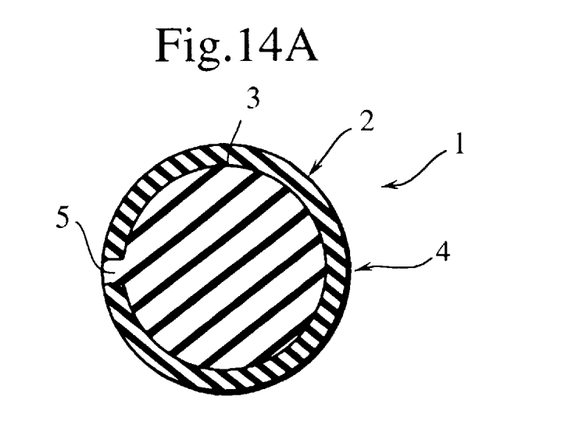
FIG. 14A is a further sectional view of a core of a golf ball.
Figure 14B:
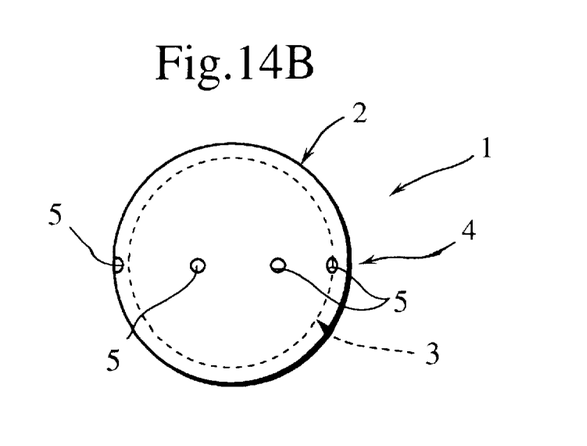
FIG. 14B is still another sectional view of a core of a golf ball.

In FIG. 1, the intrusive portion 5 is shown, that is an annular shape and a portion of the inner layer 3 is penetrated into nearly a whole seam portion 4 of the outer layer 2. The shape of the intruded portion 5 may be the one shown in FIG. 13, i.e. a portion that an inner layer 3 is intruded into a whole seam portion 4 of an outer layer 2 and formed to be thinner as it extends toward the outer diameter direction. Moreover as shown in FIG. 14A and FIG. 14B, a plurality of intruded portions 5 may be formed on a seam portion 4 by arranging an inner layer 3 to be penetrating (or entering) into a part of the seam portion 4 of an outer layer 2.

Outer layer half shell 13 may be formed by a metallic mold 6 whose off center value A and off center value B of a hemisphere-like recessed portion 7 and a hemisphere-like convex portion 9 are respectively arranged to be 0 mm. In that case, the outer layer half shell 13 is preferred to be semi-vulcanized. Furthermore, when forming an outer layer half shell 13, an unvulcanized material 12 can be completely vulcanized. However in that case, off center value A and off center value B of a hemisphere-like recessed portion 7 and a hemisphere-like convex portion 9 of a metallic mold 6 are respectively arranged to be 0.01 mm to 0.70 mm preferably to accurately form an intrusive portion 5 of an inner layer 3 into an outer layer 2.

Figure 15:
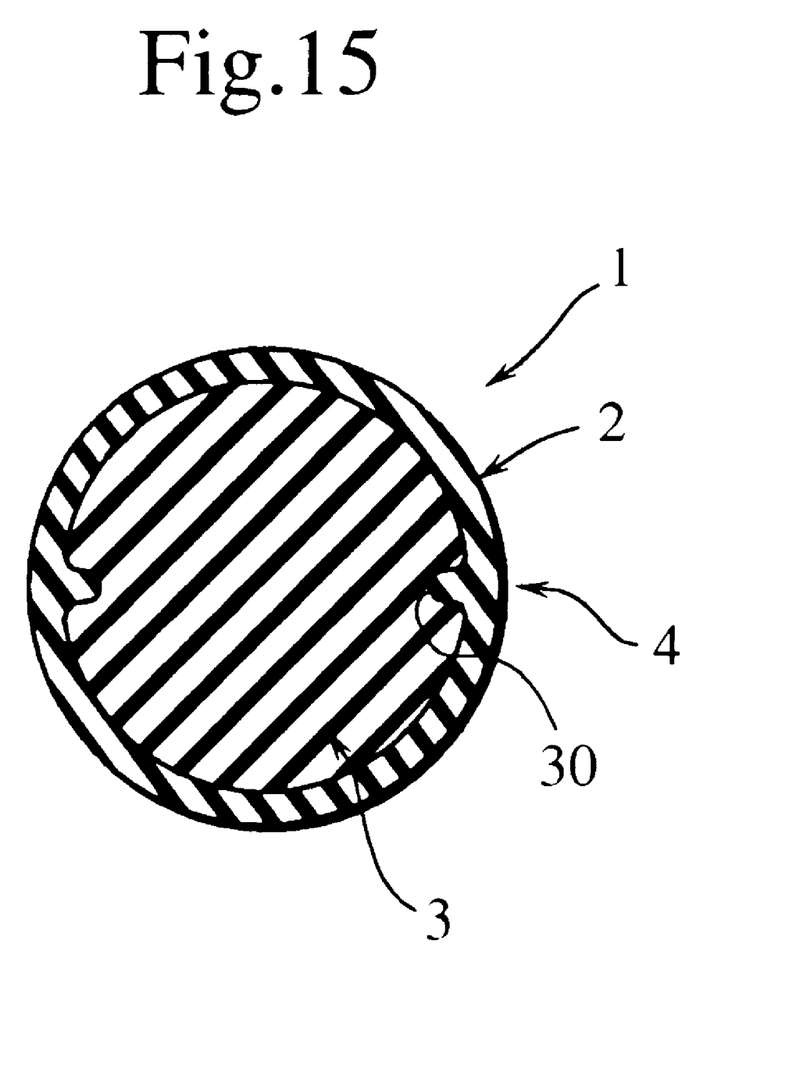
FIG. 15 is another sectional view of a core of a golf ball.

In FIG. 15, a further modification of the golf ball core 1 is shown. In the golf ball core, at least a portion of a seam portion 4 of an outer layer 2 is entered into an inner layer 3. A volume of an intrusive portion 30 is arranged to be ⅟₃₀₀ to ⅕ of a volume of the inner layer 3, supposing the inner layer 3 is a perfect hemisphere. To form the core 1 like this, a thickness of the outer flange portion 21 of the outer layer half shell 13 explained with reference to FIG. 12 is arranged to be 1.0 mm to 1.5 mm. By such arrangement of the flange portion, when vulcanizing press to form a core, a portion of the outer flange portion 21 is adequately entered into the inner layer 3 to form the intrusive portion 30. If the volume of the intrusive portion 30 is below ⅟₃₀₀ of the volume of the inner layer 3, supposing the inner layer 3 is a perfect hemisphere, eccentricity of the inner layer 3 may increase and such an inner layer 3 have adverse effect in balls' flying performance. If the volume of the intrusive portion 30 is more than ⅕ of the volume of the inner layer 3, supposing the inner layer 3 is a perfect hemisphere, degradation in balls' flying performance may be caused.

Figure 16A:
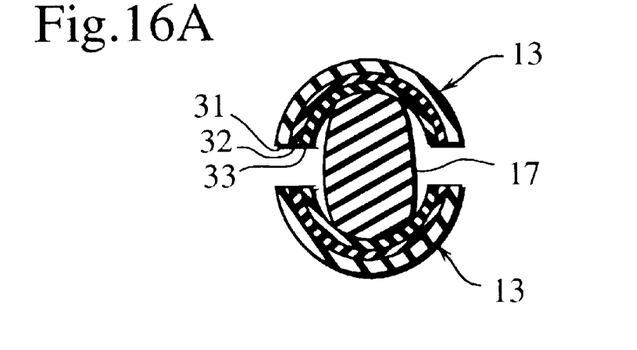
FIG. 16A is an explanatory view of a method of manufacturing an outer layer of three-layer construction.
Figure 16B:
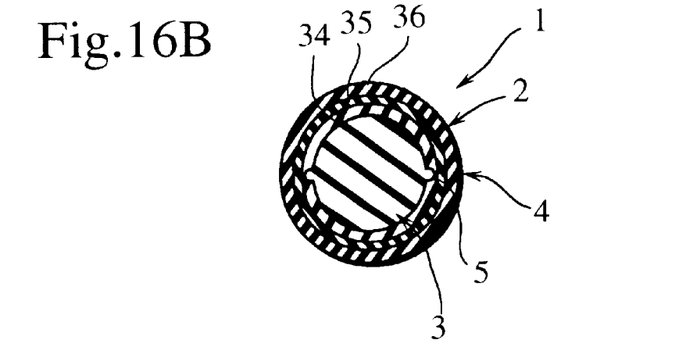
FIG. 16B is an explanatory view of a method of manufacturing an outer layer of three-layer construction.
Figure 16C:
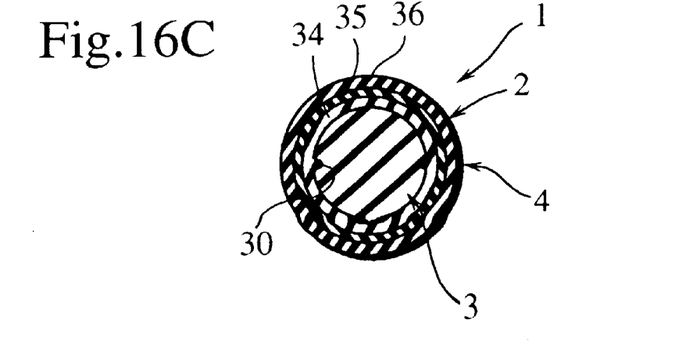
FIG. 16C is an explanatory view of a method of manufacturing an outer layer of three-layer construction.

An outer layer 2 of the golf ball cores of the present invention may be one-layer, two-layer or three-layer. That is to say, the maximum construction of the core 1 can be a four-layer construction. For example, as shown in FIG. 16A, when the outer layer 2 is designed to be three-layer construction, outer layer half shell 13 is designed to be consisting of a first layer 31, a second layer 32 and a third layer 33 and an inner layer forming material 17 is put between the outer layer half shells 13 to be vulcanizing pressed. And a four-layer core 1 shown in FIG. 16B can be obtained, which is comprising the outer layer 2 which consists of a first layer 34, a second layer 35 and a third layer 36, and the inner layer 3 having an intruded portion 5 entered into the outer layer 2. A four-layer core 1 shown in FIG. 16C may also be obtained, which is comprising an outer layer 2 consisting of a first layer 34, a second layer 35 and a third layer 36, an inner layer 3 and an intruded portion 30 which is a portion of the outer layer 2(the first layer 34) entered into the inner layer 3.

Next, Table 1 shows examples of the present invention.

Golf balls of each comprising core 1 of two-layer construction were manufactured by variously changing manufacturing conditions of cores. The various conditions such as below on manufacturing the cores as each example were conducted, which were a ratio of a volume (hereinafter it may be called as a proportion of intrusion) of an intruded portion 5 of an inner layer 3 into an outer layer 2 to a volume of the outer layer 2 supposing the outer layer 2 is a perfect spherical shell, an off-center value B of a hemisphere-like convex portion 9 of a convex mold 10, an off-center value A of a hemisphere-like recessed portion 7 of a recessed mold 8, semi-vulcanization degree of an outer layer half shell 13, and a ratio of a difference (hereinafter it may be called as a ratio of shrinkage) between an inner diameter K of an outer layer half shell 13 and an inner diameter L of an imaginary outer layer 20, which is an outer layer half shell 13 vulcanized in a free condition, to a difference between the inner diameter K of the outer layer half shell 13 and an outer diameter M of the inner layer 3 vulcanizing pressed. Each of the golf balls manufactured as each example was hit at a head speed of 45 m/s by a #1 wood (a driver) attached to a swing robot, and carry of each ball was measured. When hitting the balls, two different positions of each ball were hit, that is an intruded portion 5 of an inner layer 3 into an outer layer 2, and a point which is the farthest from the intruded portion 5 (the point forming a central angle of 90° with a seam portion 4 of a golf ball). Each of ball hits was conducted 50 times and the mean value of the results was taken. Quality of adhesiveness between an inner layer 3 and an outer layer 2, whether it is good or bad, and an eccentricity of an outer layer 2 to an inner layer 3 are also shown in Table 1.

when hitting a position apart from intrusive portion, is smaller than the carry, when hitting an intrusive portion by seven yards.

From the results in Table 1, according to the golf balls and the manufacturing method of golf ball cores of the present invention, eccentricity of an inner layer 3 to an outer layer 2 in a core 1 can be remarkably reduced, and an adhesiveness between an outer layer 2 and inner layer 3 can be effectively increased, and formed golf balls are superior in their flying performance.

In the golf balls according to the present invention, eccentricity of an inner layer 3 to an outer layer 2 in a core 1 can be remarkably reduced, and adhesiveness between an

TABLE 1

|  | example 1 | example 2 | example 3 | example 4 | example 5 | example 6 | example 7 | comparative example 1 | comparative example 2 | comparative example 3 |
|---|---|---|---|---|---|---|---|---|---|---|
| Proportion of intrusion (of intrusive portion 5) | 1/10 | 1/10 | 1/280 | 1/5 | 1/5 | 1/5 | 1/5 | 1/5 | 1/4 | 1/600 |
| Off-center value B of convex mold (mm) | 0.2 | 0.05 | 0.7 | 0.2 | 0 | 0 | 0.7 | 0.7 | 0 | 0 |
| Off-center value A of recessed mold (mm) | 0.2 | 0.05 | 0.7 | 0.2 | 0 | 0 | 0.7 | 0.7 | 0 | 0 |
| Semi-vulcanization degree (%) | 10 | 5 | 80 | 3 | 40 | 80 | 80 | 80 | 3 | 80 |
| Ratio of shrinkage by vulcanization | 0.7 | 1.0 | 0.5 | 0.6 | 1.2 | 1.0 | 0.5 | 0.3 | 3.5 | 0.3 |
| Thickness T of outer flange (mm) | 0.2 | 0.2 | 0.2 | no | no | no | 0.5 | no | 3 | no |
| Width W of outer flange (mm) | 2.0 | 1.0 | 2.0 | no | no | no | 3.0 | no | 0.2 | no |
| Carry (yards) (When hit intrusive portion) | 230 | 229 | 230 | 229 | 231 | 230 | 230 | 231 | 230 | 230 |
| Carry (yards) (When hit a position apart from intrusive portion) | 230 | 229 | 230 | 229 | 231 | 230 | 230 | 225 | 224 | 223 |
| Adhesiveness between outer layer and inner layer | good | good | good | good | good | good | good | separated | good | separated |
| Eccentricity (mm) | 0.12 | 0.13 | 0.10 | 0.09 | 0.10 | 0.10 | 0.08 | 0.13 | 0.35 | 0.40 |

As the results in Table 1 shows, in each of examples 1 to 7, the adhesion between an outer layer 2 and an inner layer 3 were all good. And an eccentricity of each of the examples 1 to 7 was 0.08 to 0.13 mm, which is remarkably small. There is no difference in the result of carry based on the difference of hitting position on a golf ball. Each result of the carry is large enough, i.e. the example balls are superior in their flying performance.

On the other hand, in the comparative example 1, proportion of intrusion is 1/5 of a volume of a supposed perfect spherical outer layer 2, which is large. The eccentricity of the balls of the comparative example 1 was small as 0.13 mm, however separation was caused between an outer layer and an inner layer. And the carry, when hitting a position apart from intrusive portion, is smaller than the carry, when hitting an intrusive portion, by six yards. In the comparative example 2, the proportion of intrusion was resulted to be 1/4 of the volume of the supposed outer layer 2, which is large, and the adhesion between an inner layer and an outer layer is good, however an eccentricity of the comparative example 2 is quite large as 0.35 mm. And the carry, when hitting a position apart from intrusive portion, is smaller than the carry, when hitting an intrusive portion, by six yards. In the comparative example 3, the proportion of intrusion was resulted to be 1/600 of the volume of the supposed outer layer 2, which is small, and an eccentricity of the comparative example 3 is quite large as 0.40 mm. Separation is caused between an outer layer and an inner layer. And the carry, outer layer 2 and inner layer 3 can be effectively increased. The balls are superior in balls' flying performance and have great durability which is the balls' resistance against a great shock by hitting.

In a golf ball core which a volume of an intrusive portion 5 of an inner layer 3 to an outer layer 2 is arranged to be 1/300 to 1/5 of a volume of the inner layer 3 supposing the inner layer 3 is a perfect hemisphere, eccentricity of the inner layer 3 to the outer layer 2 can be remarkably reduced and the adhesiveness between the inner layer 3 and the outer layer 2 can be effectively increased. Thus golf balls manufactured by the method of the present invention are superior in balls' flying performance and have great durability which is the balls' resistance against a great shock of hitting.

In the golf ball core, which at least a portion of a seam portion 4 of an outer layer 2 is entered into an inner layer 3, and the eccentricity of the inner layer 3 of a core 1 to the outer layer 2 can be remarkably reduced and the adhesiveness between the inner layer 3 and the outer layer 2 can be effectively increased. And the golf balls manufactured by the method of the present invention are superior in balls' flying performance and have great durability which is the balls' resistance against a great shock of hitting.

In the golf ball core, which a volume of an intrusive portion 30 is arranged to be 1/300 to 1/5 of a volume of the inner layer 3, supposing the inner layer 3 is a perfect hemisphere, the eccentricity of the inner layer 3 of a core 1 to the outer layer 2 can be remarkably reduced and the adhesiveness between the inner layer 3 and the outer layer 2 can be effectively increased. And the golf balls manufactured by the method of the present invention are superior in balls' flying performance and have great durability which is the balls' resistance against a great shock of hitting.

According to the manufacturing method of golf ball cores of the present invention, eccentricity of an inner layer 3 to an outer layer 2 can be reduced remarkably. An intrusive portion 5 of the inner layer 3 to the outer layer 2 can be formed, and a core 1 comprising an outer layer 2 and an inner layer 3 adhered closely can be manufactured in a simple method. The manufacturing method of the present invention reduces number of manufacturing operations of golf ball cores and increases the efficiency of manufacturing operation. Therefore the method is for mass production of golf ball cores. Moreover the construction of the metallic mold can be simple.

If an outer layer half shell 13 is manufactured by a metallic mold 6 that is comprising a hemisphere-like recessed portion 7 of a recessed mold 8, which is arranged to be shallower than a perfect hemisphere, and a hemisphere-like convex portion 9 of a convex mold 10, which is arranged to be protruding lower than a perfect hemisphere, the off-center values A, B of the hemisphere-like recessed portion 7 and the hemisphere-like convex portion 9 are respectively arranged to be 0.01 to 0.70 mm, an intrusive portion 5 of an inner layer 3 to an outer layer 2 can be formed even surely. And the variations in shape and volume of the intrusive portion 5 can be reduced.

If the semi-vulcanization degree of the outer layer half shell 13 is regulated such that the torque of the unvulcanized material measured by Curelastometer to be 5% to 80% of the difference H of the minimum value F, right after starting vulcanization, and the maximum value G after completion of vulcanization, the shape of the outer layer half shell 13 can be maintained, and the eccentricity of the inner layer 3 to the outer layer 2 can be remarkably reduced and the adhesiveness between the inner layer 3 and the outer layer 2 can be effectively increased.

If an outer layer half shell 13 is formed by a metallic mold 6 comprising a recessed mold 8 having a hemisphere-like recessed portion 7, and a convex mold 10 possessing a hemisphere-like convex portion 9 which is coated with a mold release agent 11 which is not transferable, the formed outer layer half shell 13 can be removed from the metallic mold 6 easily. The mold release agent 11 will not transfer to an inner face of the outer layer half shell 13. and the adhesiveness between the inner layer 3 and the outer layer 2 is prevented from being lower.

If composite proportion of each component in the outer layer and the inner layer to be vulcanizing pressed is arranged so that a difference between the inner diameter K of the outer layer half shell 13 and the inner diameter L of an imaginary outer layer 20, which is an outer layer half shell 13 vulcanized in a free condition, becomes 0.5 times to 3.0 times as long as a difference between the inner diameter K of the outer layer half shell 13 and an outer diameter M of an inner layer 3 which is vulcanizing pressed, the adhesiveness between the inner layer 3 and the outer layer 2 can be effectively increased, and great durability of formed golf ball can be obtained.

If an outer flange 21, 0.1 mm to 1.5 mm in thickness T and 0.5 mm to 15.0 mm in width W, is integrally formed on an opening end portion of the outer layer half shell, the outer layer half shell 13 is held in a stable position in a hemispherical recessed portion 18 of a core forming recessed mold 19 when vulcanizing press, thus the variations of the shape and the volume of the intrusive portion 5 of the inner layer 3 into the outer layer 2 can be reduced. Furthermore the volume of the intrusive portion 5 is easily arranged to be 1/300 to 1/5 of the volume of the outer layer 2, suppose the outer layer 2 is a perfect spherical shell, and the eccentricity of the inner layer 3 can be accurately decreased.

If the semi-vulcanization degree of the outer layer half shell 13 is regulated such that the torque of the unvulcanized material measured by Curelastometer to be 15% to 70% of the difference between the minimum value F, measured right after starting vulcanization, and the maximum value G measured after completion of vulcanization, and an outer layer half shell 13 is manufactured by a metallic mold 6 that is comprising a hemisphere-like recessed portion 7 of a recessed mold 8, which is arranged to be shallower than a perfect hemisphere, and a hemisphere-like convex portion 9 of a convex mold 10, which is arranged to be protruding lower than a perfect hemisphere, the off-center values A, B of the hemisphere-like recessed portion 7 and the hemisphere-like convex portion 9 are respectively arranged to be 0.05 to 0.70 mm, an intrusive portion 5 of an inner layer 3 into an outer layer 2 can be formed even surely. And the variations of the shape and the volume of the intrusive portion 5 can be reduced. The shape of the outer layer half shell 13 can be maintained, and the eccentricity of the inner layer 3 to the outer layer 2 in a core 1 can be remarkably reduced and the adhesiveness between the inner layer 3 and the outer layer 2 can be effectively increased.

While preferred embodiments of the present invention have been described in this specification, it is to be understood that the invention is illustrative and not restrictive, because various changes are possible within the spirit and indispensable features.

What is claimed is:

1. A manufacturing method of a golf ball core, comprising the steps of:
   semi-vulcanizing an unvulcanized material to form outer layer half shells whose shapes are generally hemispherical shells;
   putting an unvulcanized material for forming an inner layer between said pair of outer half shells to be vulcanizing pressed to form the golf ball core consisting of the outer and the inner layer.

2. The manufacturing method of a golf ball core as set forth in claim 1, wherein said outer layer half shells are formed by a metallic mold of which a hemisphere-like recessed portion of a recessed mold is formed to be shallower than a hemisphere, a hemisphere-like convex portion of a convex mold is formed to be protruding lower than a hemisphere, and off-center values of said hemisphere-like recessed portion and said hemisphere-like convex portion are respectively arranged to be 0.01 mm to 0.70 mm.

3. The manufacturing method of a golf ball core as set forth in claim 1, wherein semi-vulcanization degree of said outer layer half shell is regulated so that a torque of said outer layer half shell measured by Curelastometer to be 5% to 80% of a difference between a minimum value of said torque, measured right after starting vulcanization, and a maximum value of said torque, measured after completion of vulcanization.

4. The manufacturing method of a golf ball core as set forth in claim 1, wherein said outer layer half shells are formed by a metallic mold comprising a recessed mold provided with a hemisphere-like recessed portion, and a convex mold provided with a hemisphere-like convex portion which is coated with a mold release agent without a property of transfer.

5. The manufacturing method of a golf ball core as set forth in claim 1, wherein a composite proportion of each component in said outer layer and said inner layer to be vulcanizing pressed is arranged so that a difference between an inner diameter of said outer layer half shell and an inner diameter of an imaginary outer layer, that is an outer layer half shell vulcanized in a free condition, to be 0.5 times to 3.0 times as long as a difference between said inner diameter of said outer layer half shell and an outer diameter of an inner layer after completion of vulcanizing press.

6. The manufacturing method of a golf ball core as set forth in claim 1, wherein an outer flange, 0.1 mm to 1.5 mm in thickness and 0.5 mm to 15.0 mm in width, is integrally formed on an opening end portion of said outer layer half shell.

7. The manufacturing method of a golf ball core as set forth in claim 1, 4, 5 or 6, wherein a semi-vulcanization degree of said outer layer half shell is regulated so that a torque of said outer layer half shell measured by Curelastometer to be 15% to 70% of a difference between a minimum value, measured right after starting vulcanization, and a maximum value, measured after completion of vulcanization, and said outer layer half shell 13 is manufactured by a mold comprising a hemisphere-like recessed portion provided with a recessed mold, which is arranged to be shallower than a hemisphere, and a hemisphere-like convex portion provided with a convex mold, which is arranged to be protruding lower than a hemisphere, and off-center values of said hemisphere-like recessed portion and said hemisphere-like convex portion are respectively arranged to be 0.05 to 0.70 mm.

* * * * *